(No Model.)

O. C. WHITE.
CLAMP FOR BALLS AND SOCKETS.

No. 304,886. Patented Sept. 9, 1884.

Witnesses
S. N. Piper
E. B. Pratt

Inventor
Otis Converse White
by R. H. Eddy  atty.

UNITED STATES PATENT OFFICE.

OTIS CONVERSE WHITE, OF WORCESTER, MASSACHUSETTS.

CLAMP FOR BALLS AND SOCKETS.

SPECIFICATION forming part of Letters Patent No. 304,886, dated September 9, 1884.

Application filed June 30, 1884. (No model.)

*To all whom it may concern:*

Be it known that I, OTIS CONVERSE WHITE, of the city and county of Worcester, of the Commonwealth of Massachusetts, have invented a new and useful Improvement in Clamps for Ball-Sockets, &c.; and I do hereby declare the same to be described in the following specification, and represented in the accompanying drawings, of which—

Figure 1:
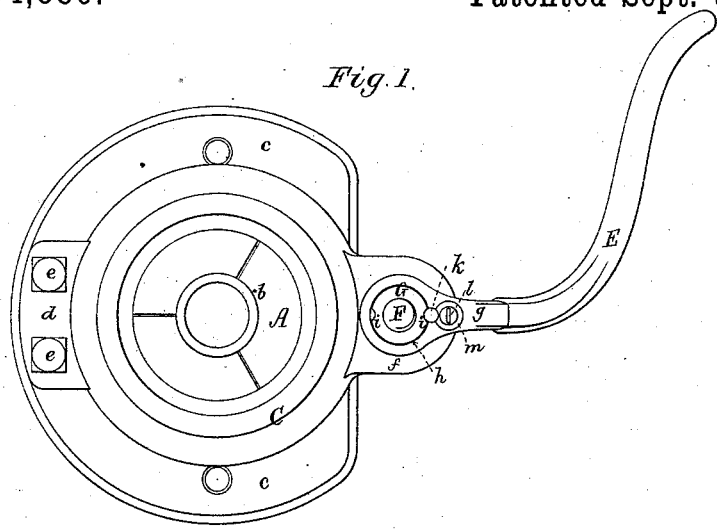
Figure 2:
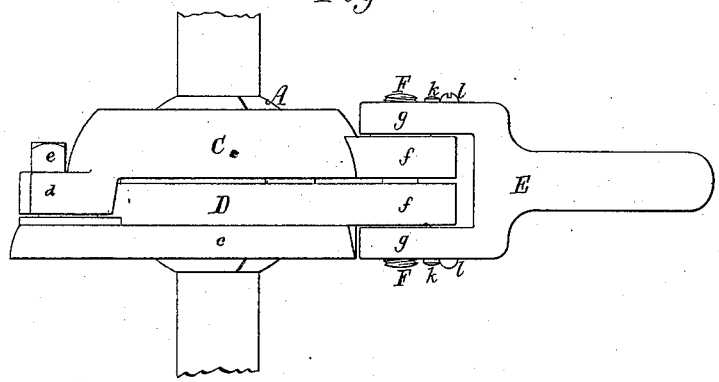
Figure 3:
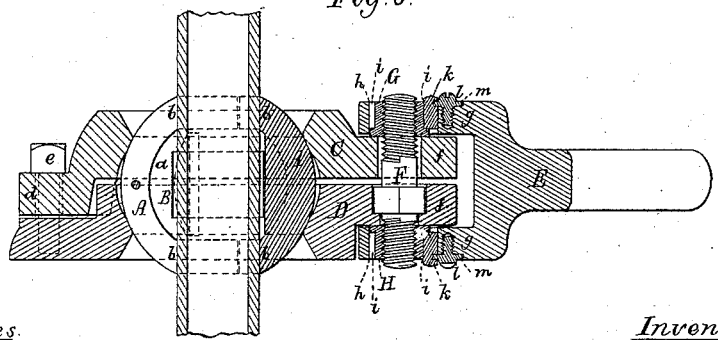

Figure 1 is a top view; Fig. 2, a side elevation; and Fig. 3 a longitudinal section of a sectional ball and its separable socket, and the clamping mechanism of the latter.

The nature of my invention is duly set forth in the claim or claims hereinafter presented.

The ball (shown at A) is spherical, and it has within it, concentric with its periphery, a spherical chamber, $a$. Besides such chamber there extends through the ball diametrically a cylindrical hole, $b$, and such ball is cut or formed in three or other suitable number of separate parts or sections, whose flat edges are in planes radial or about so to the axis of the said hole. Extending around within the chamber of the ball is a curved spring, B, for forcing the ball-sections apart from each other, and, besides, each of such sections is or may be provided with one or more pins or dowels, to extend from one edge of it, and loosely, into a corresponding aperture or apertures in the next section. This ball has a collapsible socket composed of two sections, C and D, each being recessed in manner as shown, to receive and fit to the ball. The lower section, D, is furnished with a flange, $c$, extending from it, as represented, for the purpose of supporting it on and applying it to a chair seat or back. The upper section, C, has an ear, $d$, projecting from it, over and upon the flange of the lower section, such ear being connected to the said flange by headed screws $e\ e$, going somewhat loosely through holes in the ear, and screwed into the flange, the same being so as to pivot one section to the other. In the place of such connections the two sections may be joined together by a hinge. Each section also has an ear, $f$, extending from it between the two prongs $g\ g$ of a furcated lever, E. A right and left threaded screw, F, goes through both ears, and projects beyond them into cylindrical nuts G H screwed upon it. The screw, where in one section, is prismatic, to prevent it from revolving therein. The screw-thread of one section is pitched in a direction opposite to that of the other section, and the nuts to work on the said threads are placed in cylindrical chambers $h$ in the prongs of the lever. Each nut has notches $i$ in its periphery, either of them being to receive a key, $k$, extended partly into the notch and partly into the prong, and held in place by a nicked screw, $l$, that is screwed into the prong, and provided with a circular flange, $m$, to enter a notch in the key. On back-screwing the screw, the key by the flange will be lifted out of the notches in the prong and nut. When the key is in place, it will be retained there by the screw and its flange so long as the screw may be within the prong. By moving the lever one way, it will simultaneously revolve the nuts on their screws in a manner to cause both nuts to approach each other thereon, and to crowd toward each other and upon the ball the two sections of the socket, and thereby clamp the ball firmly within its socket, and to a cylindrical rod or spindle when extending through the hole in the ball. Each nut, by being notched, as described, and revoluble in the prong of the lever, can be revolved and made to receive the connection-key, as may be necessary to properly adjust the nut to its section of the socket.

I do not herein claim a ball or sphere in sections and having a hole through it diametrically, and arranged within a socket in sections, and provided with means of clamping them on it, the said ball to contract it upon a rod or article extending through it; but

I claim—

1. The ball-socket sections provided with the screw extending through them, and having threads running in opposite directions, in combination with the cylindrical nuts to such screws, and with the furcated lever having the nuts in cylindrical sockets in its prongs, and also having means of connecting each nut with its prong, so that both nuts may be turned on their screws by means of the lever, all being substantially as set forth.

2. Each cylindrical nut slotted in its periphery, and arranged in a cylindrical socket in one of the prongs of the lever, in combination with the key inserted in the nut and prong, and with the screw screwed into the prong, and provided with the flange extending into the key, all being substantially as set forth.

3. The combination of the bolt or double-threaded screw having threads running in opposite directions, as described, with the two sections through which said bolt or screw is arranged, and with the nuts upon the screw-threads, and with the furcated lever applied to such nuts, so as when turned in one direction to simultaneously revolve them to cause the two sections to be moved toward each other.

OTIS CONVERSE WHITE.

Witnesses:
R. H. EDDY,
E. B. PRATT.